United States Patent
Tao et al.

(10) Patent No.: US 10,852,736 B2
(45) Date of Patent: Dec. 1, 2020

(54) METHOD TO TRACK AND TO ALERT AUTONOMOUS DRIVING VEHICLES (ADVS) OF EMERGENCY VEHICLES

(71) Applicant: Baidu USA LLC, Sunnyvale, CA (US)

(72) Inventors: Jiaming Tao, Sunnyvale, CA (US); Yifei Jiang, San Jose, CA (US); Liangliang Zhang, Sunnyvale, CA (US); Dong Li, Sunnyvale, CA (US); Jiangtao Hu, Sunnyvale, CA (US); Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 67 days.

(21) Appl. No.: 15/944,783

(22) Filed: Apr. 3, 2018

(65) Prior Publication Data

US 2019/0302781 A1  Oct. 3, 2019

(51) Int. Cl.
*G05D 1/02* (2020.01)
*G01C 21/34* (2006.01)
*G08G 1/0965* (2006.01)

(52) U.S. Cl.
CPC ....... *G05D 1/0214* (2013.01); *G01C 21/3492* (2013.01); *G08G 1/0965* (2013.01)

(58) Field of Classification Search
CPC . G05D 1/0214; G01C 21/3492; G08G 1/0965
USPC .......................................................... 701/23
See application file for complete search history.

(56) References Cited

U.S. PATENT DOCUMENTS

| | | | |
|---|---|---|---|
| 9,547,986 B1* | 1/2017 | Curlander | G08G 1/09 |
| 2009/0140887 A1* | 6/2009 | Breed | G01C 21/165 |
| | | | 340/990 |
| 2017/0213462 A1* | 7/2017 | Prokhorov | G08G 1/0965 |
| 2017/0276492 A1* | 9/2017 | Ramasamy | G01C 21/34 |
| 2018/0096596 A1* | 4/2018 | Lee | G08G 1/096725 |
| 2019/0049994 A1* | 2/2019 | Pohl | G05D 1/0278 |
| 2019/0088148 A1* | 3/2019 | Jacobus | B60W 10/20 |
| 2019/0130739 A1* | 5/2019 | Khedkar | G08G 1/093 |

FOREIGN PATENT DOCUMENTS

JP  2016181140  10/2016

* cited by examiner

*Primary Examiner* — Yazan A Soofi
(74) *Attorney, Agent, or Firm* — Womble Bond Dickinson (US) LLP

(57) ABSTRACT

In one embodiment, a system sends current location information of the ADV to an alert service over a network, where the alert service is communicatively coupled to a number of ADVs. The system receives a broadcasted alert signal from the alert service, where the alert service has determined that the ADV is or will be located in an alert area, and the location of the alert area is determined based on a location of a dispatched vehicle having a higher priority of traveling. In response to receiving the broadcast alert signal, the system examines a current state and the current location of the ADV in view of the alert area to determine whether the ADV should overtake or yield the alert area based on a set of rules. The system generates a trajectory to control the ADV to navigate the alert area based on the examination.

19 Claims, 15 Drawing Sheets

METHOD TO TRACK AND TO ALERT AUTONOMOUS DRIVING VEHICLES (ADVS) OF EMERGENCY VEHICLES

TECHNICAL FIELD

Embodiments of the present disclosure relate generally to operating autonomous vehicles. More particularly, embodiments of the disclosure relate to a method and system to track and to alert autonomous driving vehicles (ADVs) of emergency vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Emergency vehicles deal with life-threatening situations, and permitted by law to break conventional traffic rules under emergency situations, such as driving through an intersection when the traffic light is red, or exceeding the speed limit. Normal vehicles react to emergency vehicles differently, such as yielding to emergency vehicles, slowing down, signaling, and moving to a right shoulder of the roadway when safe to do so.

Emergency vehicles usually sound an alarm together with flashing a flood light on its top, to alert other vehicles, cyclists and pedestrians of an emergency situation. However, sounds and lights may not be perceived, if at all, by a sensor system of an ADV as an emergency situation.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a system and method alerts an ADV of nearby emergency vehicles to control the ADV to yield to or to move away from the emergency vehicles in a safe manner. According to one aspect, a system sends current location information of the ADV to an alert service over a network, where the alert service is communicatively coupled to a number of ADVs. The system receives a broadcasted alert signal from the alert service, where the alert service has determined that the ADV is or will be located in an alert area, and the location of the alert area is determined based on a location of a dispatched vehicle having a higher priority of traveling. In response to receiving the broadcast alert signal, the system examines a current state and the current location of the ADV in view of the alert area to determine whether the ADV should overtake or yield the alert area based on a set of rules. The system generates a yield trajectory to control the ADV to navigate the alert area based on the examination.

According to another aspect, a system receives current location information from one or more dispatched vehicles, the dispatched vehicles having a higher priority of travel on roads. The system determines one or more alert areas based on the location information for the one or more dispatched vehicles. The system receives current location information from one or more ADVs. The system determines if any of the ADVs will enter or is currently within a predetermined proximity of the one or more alert areas based on the current location information of the ADVs. The system broadcasts an alert signal to the ADV, in response to determining that the ADV will enter or is currently within the predetermined proximity of the one or more alert areas.

Figure 1:
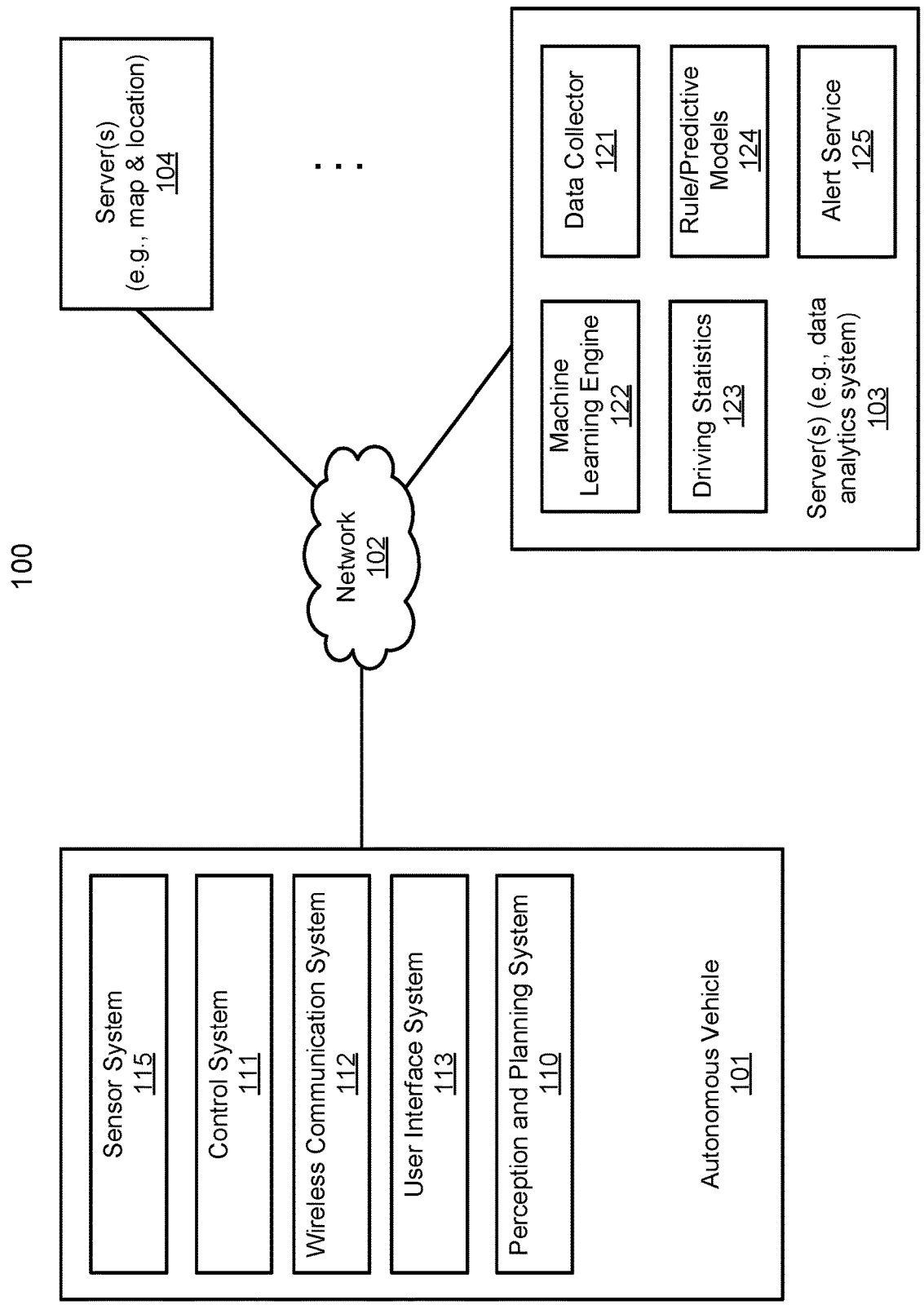
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
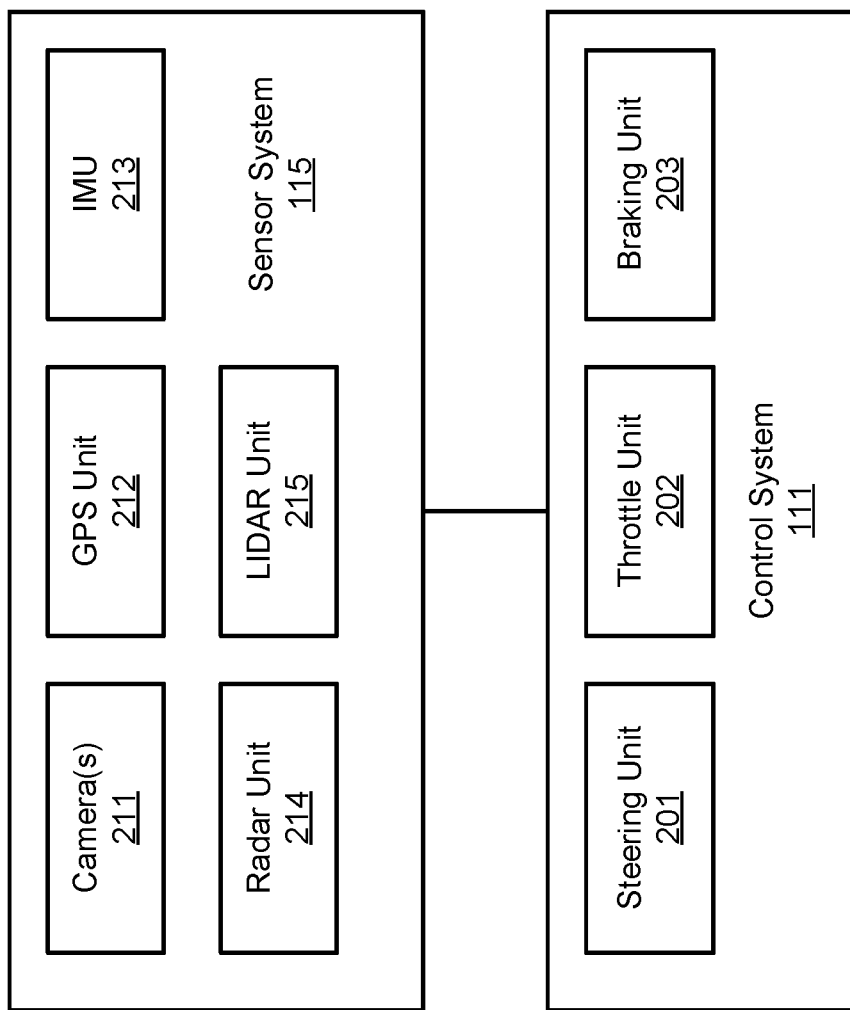
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, weather conditions, and road conditions, such as slow traffic on freeway, stopped traffic, car accident, road construction, temporary detour, unknown obstacles, etc.

Based on driving statistics 123, machine learning engine 122 generates or trains a set of rules, algorithms, and/or predictive models 124 for a variety of purposes, including rules for determining emergency alert areas (areas where vehicles would likely have to yield to emergency vehicles in an emergency situation) on a roadway based on locations of emergency vehicles. Alert service 125 can alert, via a network, ADVs currently on the determined alert areas or will enter the determined alert areas for the ADV to yield to any emergency vehicles.

Figure 3A:
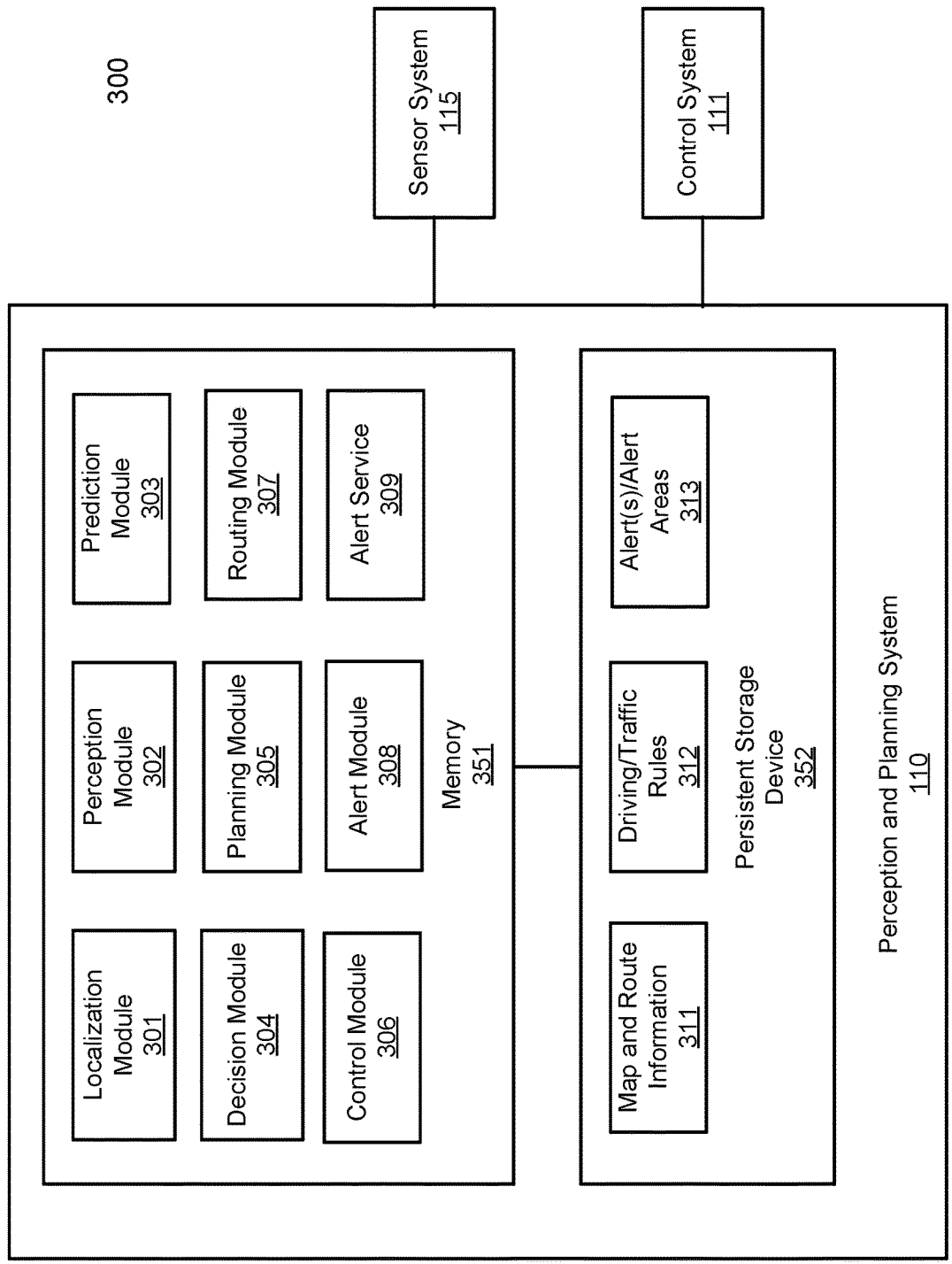
FIGS. 3A-3B are block diagrams illustrating an example of a perception and planning system used with an autonomous vehicle according to one embodiment.
Figure 3B:
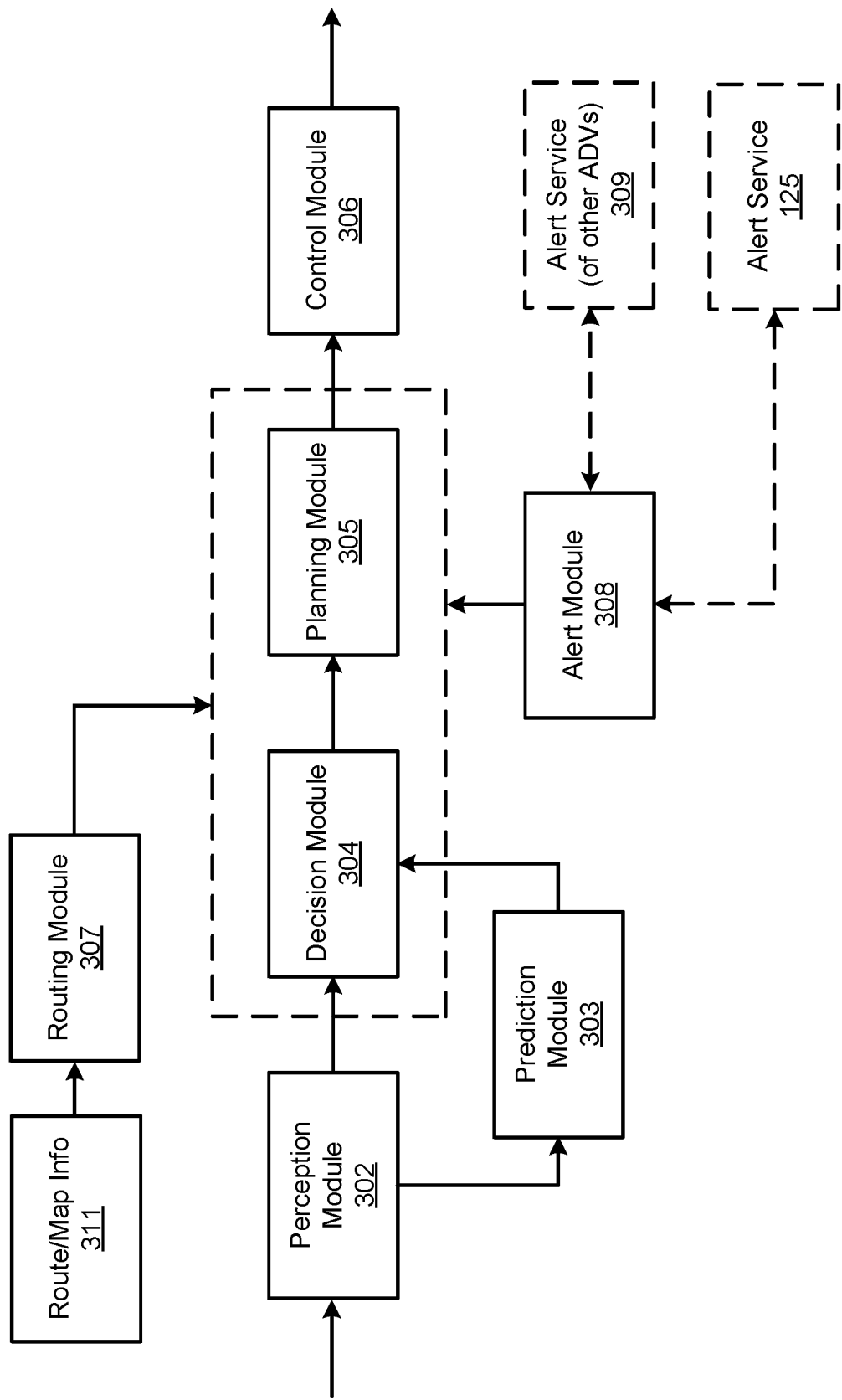

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, alert module 308, and alert service 309.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module. For example, alert module 308 and alert service 309 can be an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to entering the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, alert module 308 provides an interface for an ADV to broadcast its location to an alert service and to receive alert signal(s), if any, to inform the ADV of near emergency vehicles. Alert module 308 can also initiate an emergency yield mode of the ADV to pull aside or yield the ADV to incoming traffic.

In one embodiment, alert service 309 can receive vehicle information for other ADVs. Depending on alert area(s) determined by alert service 309, alert service 309 can generate an alert and broadcast the alert to the other ADVs so the other ADVs can subsequently pull aside or yield the ADV for incoming traffic.

Figure 4:
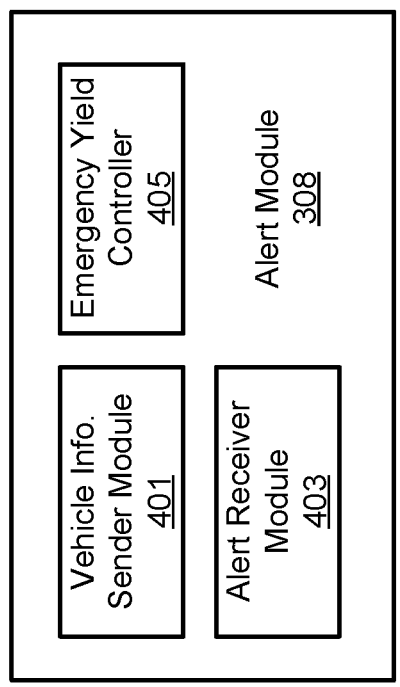
FIG. 4 is a block diagram illustrating an example of an alert module according to one embodiment.

FIG. 4 is a block diagram illustrating an example of an alert module according to one embodiment. Referring to FIG. 4, alert module 308 can send a location and/or route information of the ADV to an alert service, such as alert service 125 of server 103 or alert service 309 (e.g., an alert service hosted on another ADV) of other ADVs. Alert module 308 can receive an alert and place the ADV in an emergency yield mode. In one embodiment, alert module can include vehicle information sender module 401, alert receiver module 403, and emergency yield controller 405. Vehicle information sender module 401 can send a location and/or route information of the ADV to an alert service. Alert receiver module 403 can receive alerts to alert the ADV of nearly emergency vehicles. Emergency yield controller 405 can place the ADV in an emergency yield mode.

Figure 5:
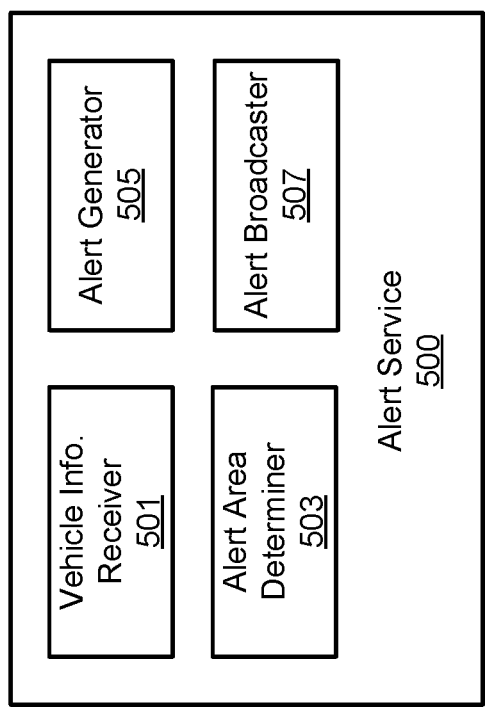
FIG. 5 is a block diagram illustrating an example of an alert service according to one embodiment.

FIG. 5 is a block diagram illustrating an example of an alert service according to one embodiment. Alert service 500 can be alert service 309 of FIG. 3A or alert service 125 of FIG. 1. Note, in some embodiments, alert service 500 can be a part of the ADV. That is, ADVs can be both a client and a server at the same time. ADV can be a client receiving alerts. At the same time, ADV can be a server hosting an alert service to inform other ADVs nearby of emergency vehicles, such that the alert service hosting can be distributed among several ADVs. In another embodiment, alert service 350 can be a central service hosted by server 103.

Alert service 500 can generate an alert and broadcast the alert to ADVs. In one embodiment, alert service 500 includes vehicle information receiver 501, alert area determiner 503, alert generator 505, and alert broadcaster 507. Vehicle information receiver 501 can receive a location and/or route information from a vehicle such as an emergency vehicle or an ADV. Alert area determiner 503 can determine an alert area based on a location and/or route of an emergency vehicle. Alert generation 505 can generate alerts to alert ADVs of nearby emergency vehicles in an emergency situation. Alert broadcaster 507 can broadcast alerts to alert ADVs of nearby emergency vehicles so that ADVs can plan an emergency trajectory accordingly.

Figure 6A:
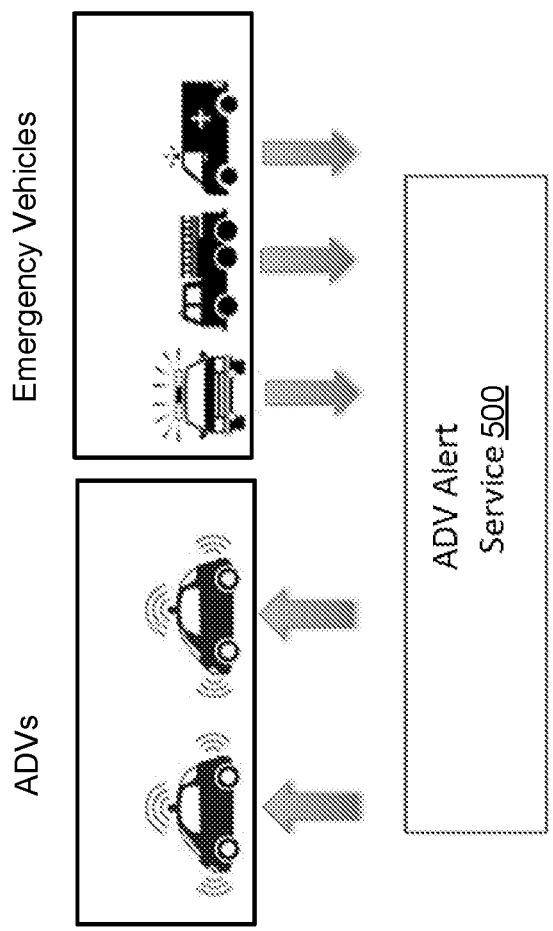
FIGS. 6A-6B are block diagrams illustrating examples of alert service configurations according to some embodiments.
Figure 6B:
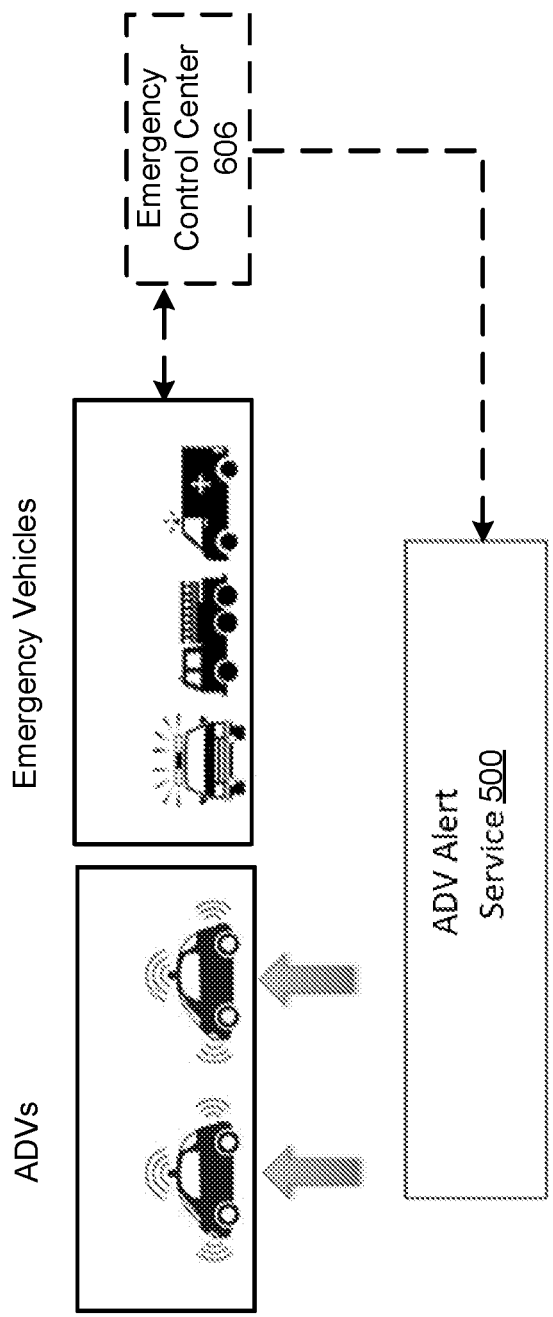

FIGS. 6A-6B are block diagrams illustrating examples of alert service configurations according to some embodiments. Referring to FIG. 6A, alert service 500 can be communicatively coupled to ADVs and/or emergency vehicles via a wireless network. Alert service 500 can be a service hosted on a central server such as server 103 or can be hosted on other ADVs such as ADV 101. Referring to FIG. 6B, alert service 500 may be communicatively coupled to ADVs and a third party provider such as an emergency control center 606 via a wireless network. The third party provider would have access to location and/or route information of emergency vehicles to provide alert service 500 of any location and/or route information of emergency vehicles.

FIGS. 7A-7D are block diagrams illustrating different alert areas based on route information of an emergency vehicle according to some embodiments. Referring to FIGS. 7A-7D, an emergency vehicle (e.g., dispatch vehicle 701) and ADVs 702-704 are commuting vehicles near intersection 700. Intersection 700 can be a four way intersection and the four ways of traffic directions are each separated by islands and curbs.

Figure 7A:
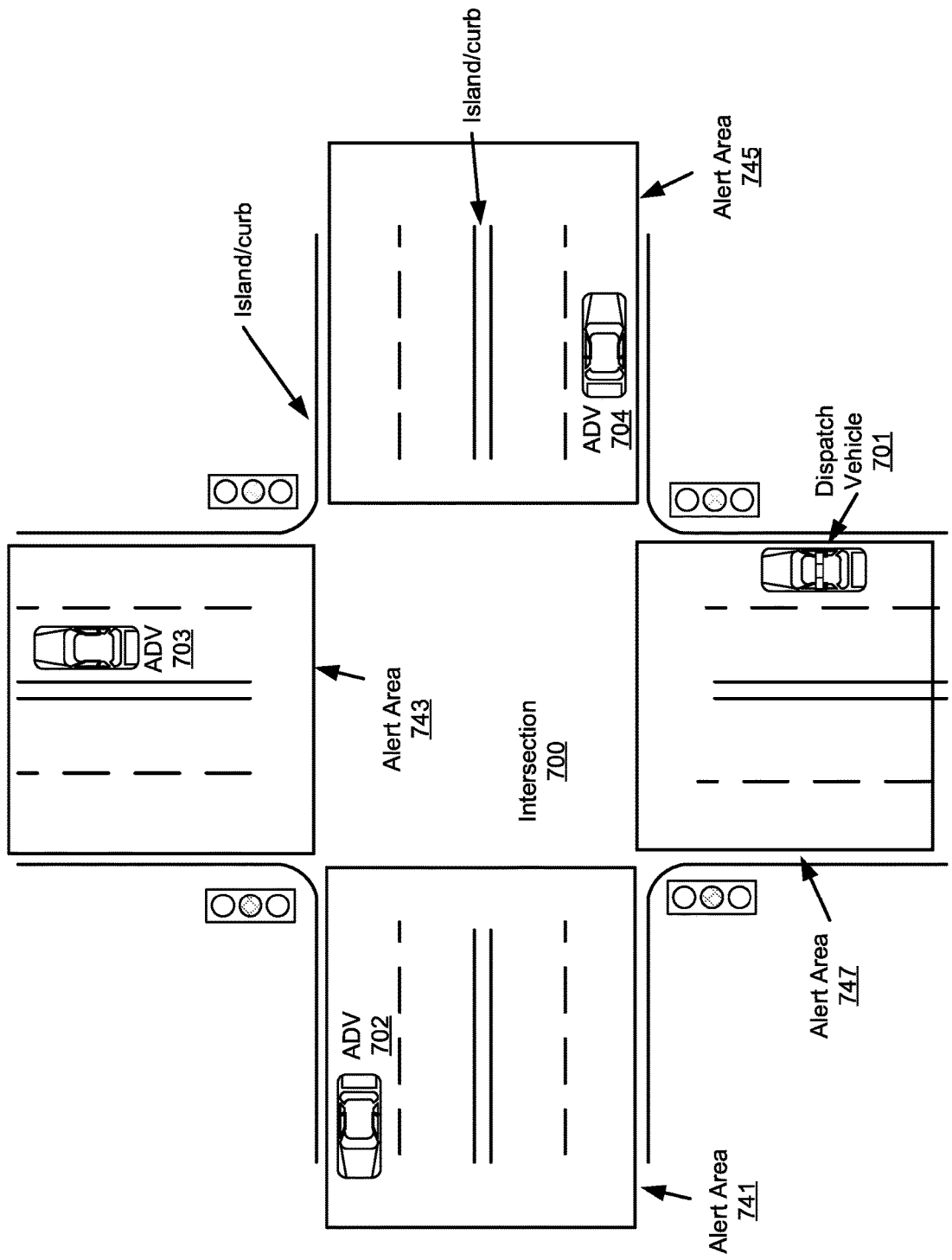
FIGS. 7A-7D are block diagrams illustrating different alert areas based on route information of an emergency vehicle according to some embodiments.

Referring to FIG. 7A, in one embodiment, an alert service (not shown) is communicatively coupled to ADVs 702-704 and dispatch vehicle 701 via a wireless network. ADVs 702-704 periodically send their current location and/or route information to the alert service over the network. Dispatch vehicle 701 can be in an emergency mode (e.g., sirens and lights are on) or dispatch vehicle 701 may not be in an emergency mode. In this scenario, as dispatch vehicle 701 transitions into an emergency mode while it is approaching intersection 700, dispatch vehicle 701 may send location information and indicator information to the alert service that it has engaged in an "ON" emergency mode, directly or via a third party provider. Based on the location information of dispatch vehicle 701 and a map information of the road intersection and nearby road sections (e.g., placements of islands and curb), alert service analyzes the road surface to determine one or more alert areas (e.g., alert areas 741-747) surrounding dispatch vehicle 701 for which ADVs should pull over or yield to dispatch vehicle 701. Having periodically received location and/or route information of ADVs 702-704, alert service 500 determines if any of the ADVs 702-704 will enter or is currently within a predetermined proximity of the alert areas. In response to determining that ADVs 702-704 will enter or is currently within the predetermined proximity of the one or more alert areas, alert service broadcasts "emergency yield" alert signals to ADVs 702-704 for the ADVs 702-704 to pull over or yield to any incoming traffic. ADVs 702-704 can then generate a trajectory to control the ADV to pull over to a left or a right side, depending on which lane each of the ADVs is currently located or can safely do so. In one embodiment, each of ADVs 702-704 can response with a receipt signal to indicate ADVs 702-704 has received the alert signals.

In another embodiment, alert service continuously receives location information from dispatch vehicle 701. Alert service calculates and determines one or more updated alert areas based on the updated location information of dispatch vehicle 701. Based on the updated alert areas alert services determines if any new ADVs is within or will enter the alert areas. In response to determining additional ADVs is within or will enter the alert areas, alert service broadcasts an alert to the additional ADVs to pull over or yield to any incoming traffic including dispatch vehicle 701.

In another embodiment, ADVs 702-704 sends speed and route information to alert service. Based on the speed and route information of the ADV, e.g., how fast and/or in which direction the vehicle is travelling, alert service extends or shortens a length of the one or more alert areas based on a configuration of the road segments for alert service to determine whether ADVs 702-704 is within or will enter these alert areas.

In another embodiment, alert service receives an indicator from dispatch vehicle 701 that it has engaged to an "OFF" emergency mode. In this case, alert service updates the alert area corresponding to dispatch vehicle 701 or simply removes the corresponding alert area. Since ADVs 702-704 may no longer be in an alert area, alert service broadcasts a "resume" alert signal to ADVs 702-704 for ADVs 702-704 to resume a normal operation. In one embodiment, each of ADVs 702-704 can response with a receipt signal to indicate that ADVs 702-704 has received the alert signals.

According to a further embodiment, the alert service can simply determine the alert area(s) based on the current location of the dispatch vehicle(s) and broadcast the information concerning the alert areas to the vehicles that have subscribed to the alert services and/or are within a predetermined proximity of the alert areas. It is up to the nearby vehicles to determine how to proceed based on their respective driving scenarios (e.g., driving straight, left/right turn, U-turn, etc.) at the point in time in view of the alert areas. Furthermore, the alert service can also simply periodically broadcast the current location of the dispatch vehicles to the nearby vehicles. The nearby vehicles can then track the movement of the dispatch vehicles and determine the direction and speed of the dispatch vehicles based on the tracking. The nearby vehicles can then determine the alert areas and how to proceed in view of the alert areas. Other implementations may also be applied herein.

Figure 7B:
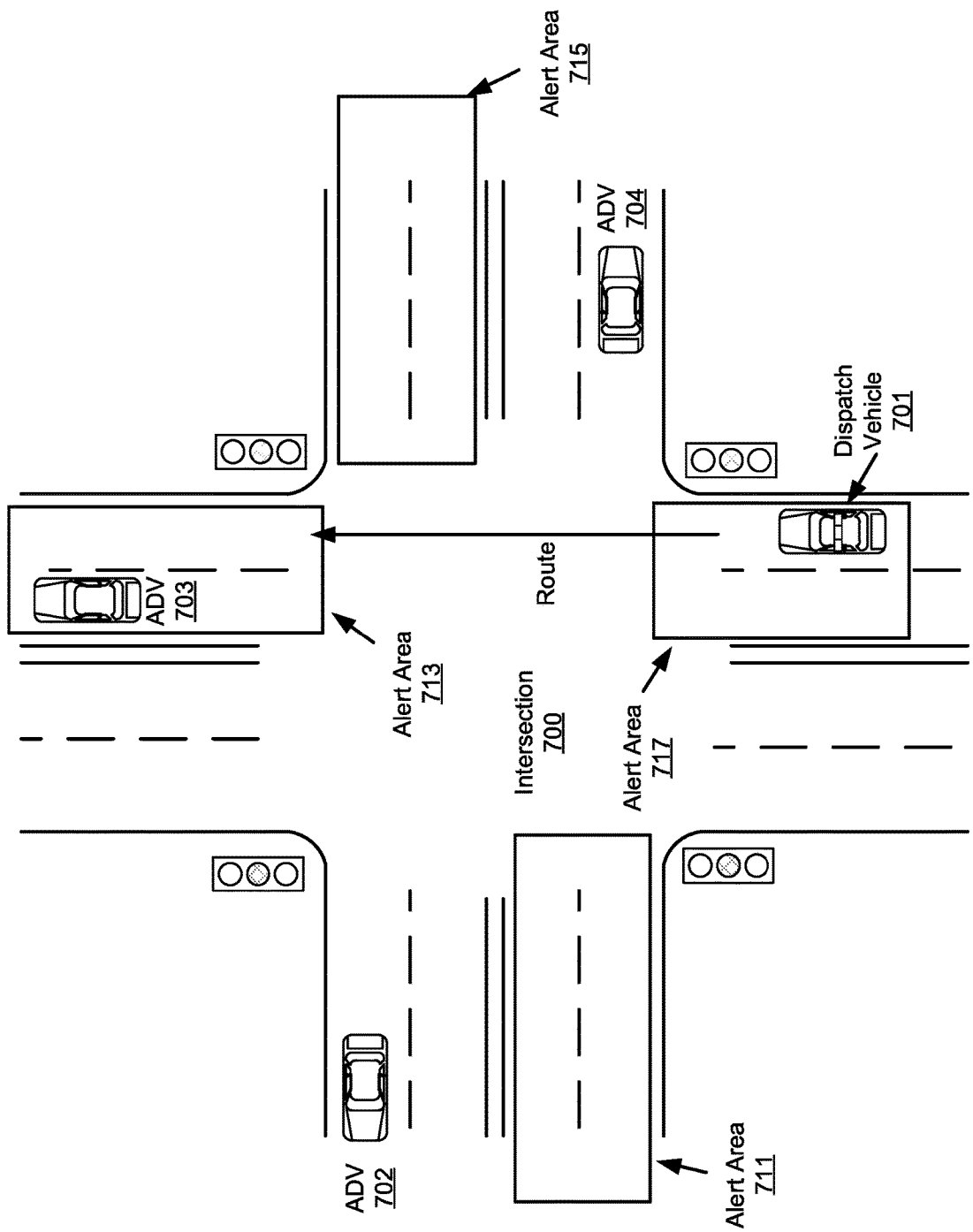

Referring to FIG. 7B, in this scenario, dispatch vehicle 701 engages in an emergency mode and sends a location information, a route information, and an indicator that it is engaged in an emergency situation to alert service. Based on the route information, alert service determines dispatch vehicle has a directional heading to go straight ahead at intersection 700. Based on the route information and the location information of dispatch vehicle 701, alert service can determine alert areas associated with dispatch vehicle 701 to be alert areas (711-717). Based on the alert areas, in this case, alert service broadcast an "emergency yield" alert signal to ADV 703 for ADV 703 to pull over or yield to incoming traffic.

Figure 7C:
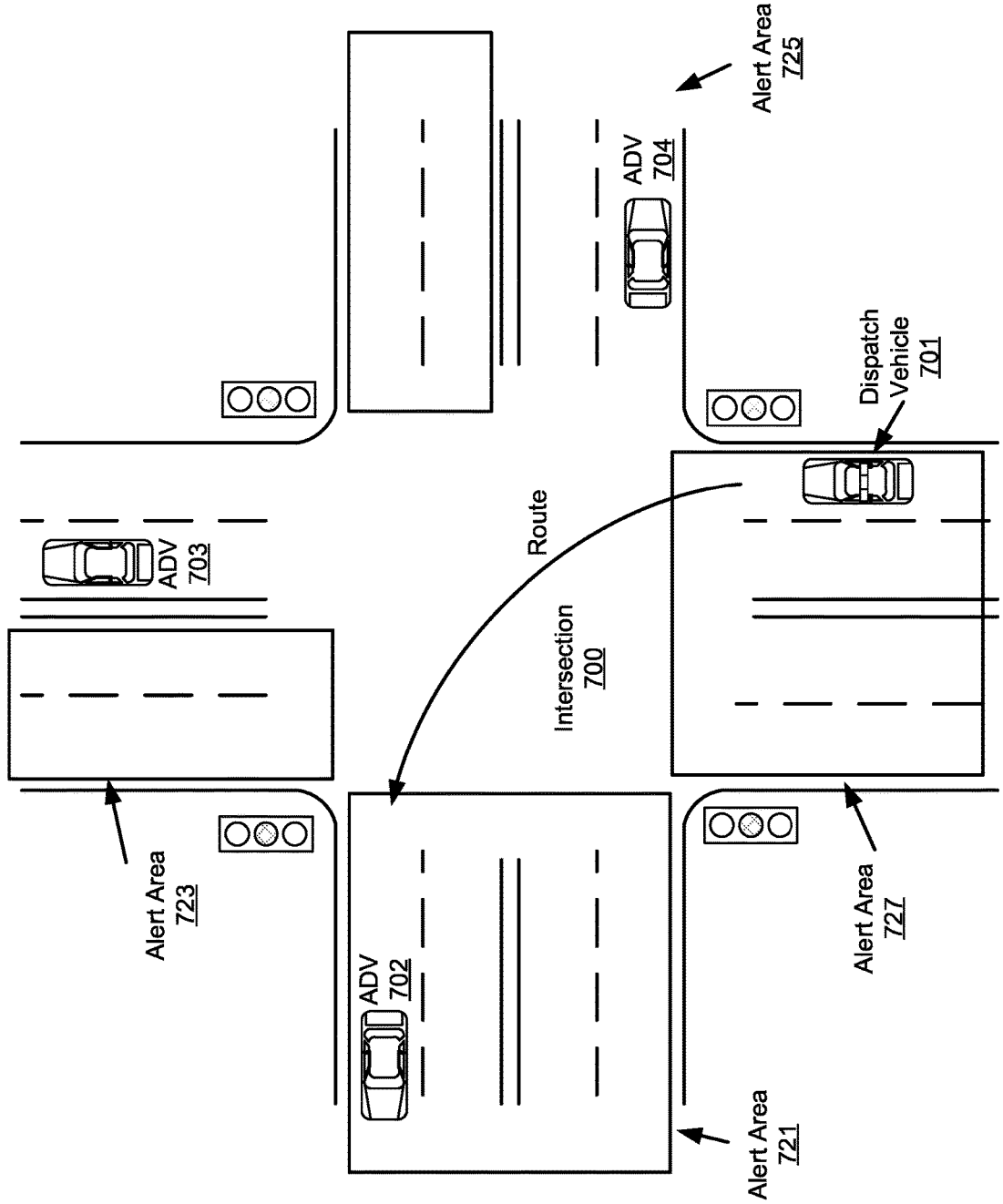

Referring to FIG. 7C, in this scenario, dispatch vehicle 701 engages in an emergency mode and sends a location information, a route information, and an indicator that it is engaged in an emergency situation to alert service. Based on the route information, alert service determines dispatch vehicle has a directional heading to turn left at intersection 700. Based on the route information and the location information of dispatch vehicle 701, alert service can determine alert areas associated with dispatch vehicle 701 to be alert areas 721-727. Based on the alert areas 721-727, alert service broadcast an "emergency yield" alert signal to ADV 702 for ADV 702 to pull over or yield to incoming traffic.

Figure 7D:
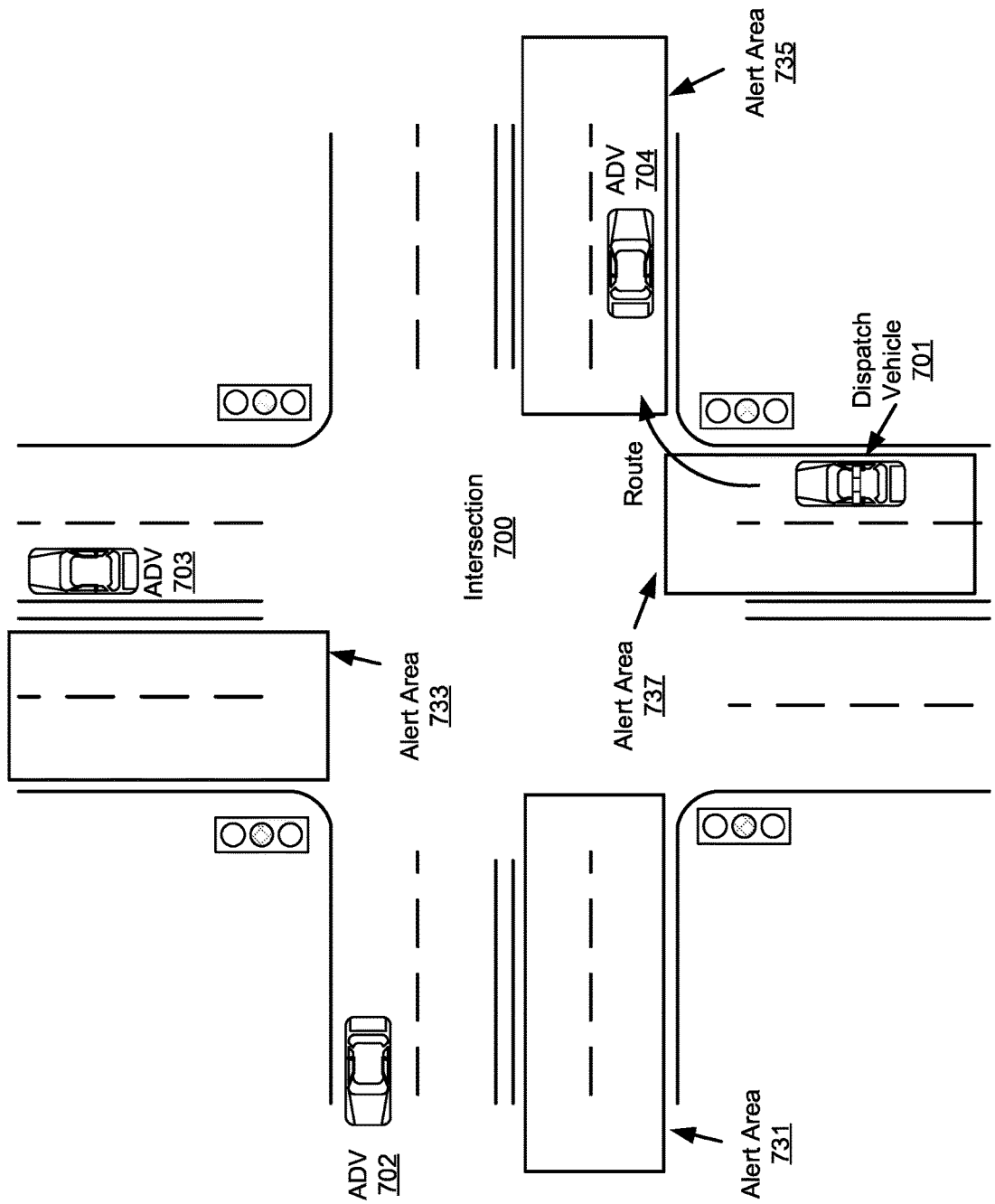

Referring to FIG. 7D, in this scenario, dispatch vehicle 701 engages in an emergency mode and sends a location information, a route information, and an indicator that it is engaged in an emergency situation to alert service. Based on the route information, alert service determines dispatch vehicle has a directional heading to turn right at intersection 700. Based on the route information and the location information of dispatch vehicle 701, alert service can determine alert areas associated with dispatch vehicle 701 to be alert areas 731-737. Based on the alert areas 731-737, alert service broadcast an "emergency yield" alert signal to ADV 704 for ADV 704 to pull over or yield to incoming traffic.

Referring to FIG. 7B-7D, when dispatch vehicle 701 disengages, dispatch vehicle 701 sends an indicator signal to alert service that it is no longer in an emergency situation. Alert service then updates the alert areas or removes the alert areas and broadcasts "resume" alert signals to any ADVs in the alert areas or previously have received alert signals from alert service for the ADVs to resume a normal operation.

Figure 8:
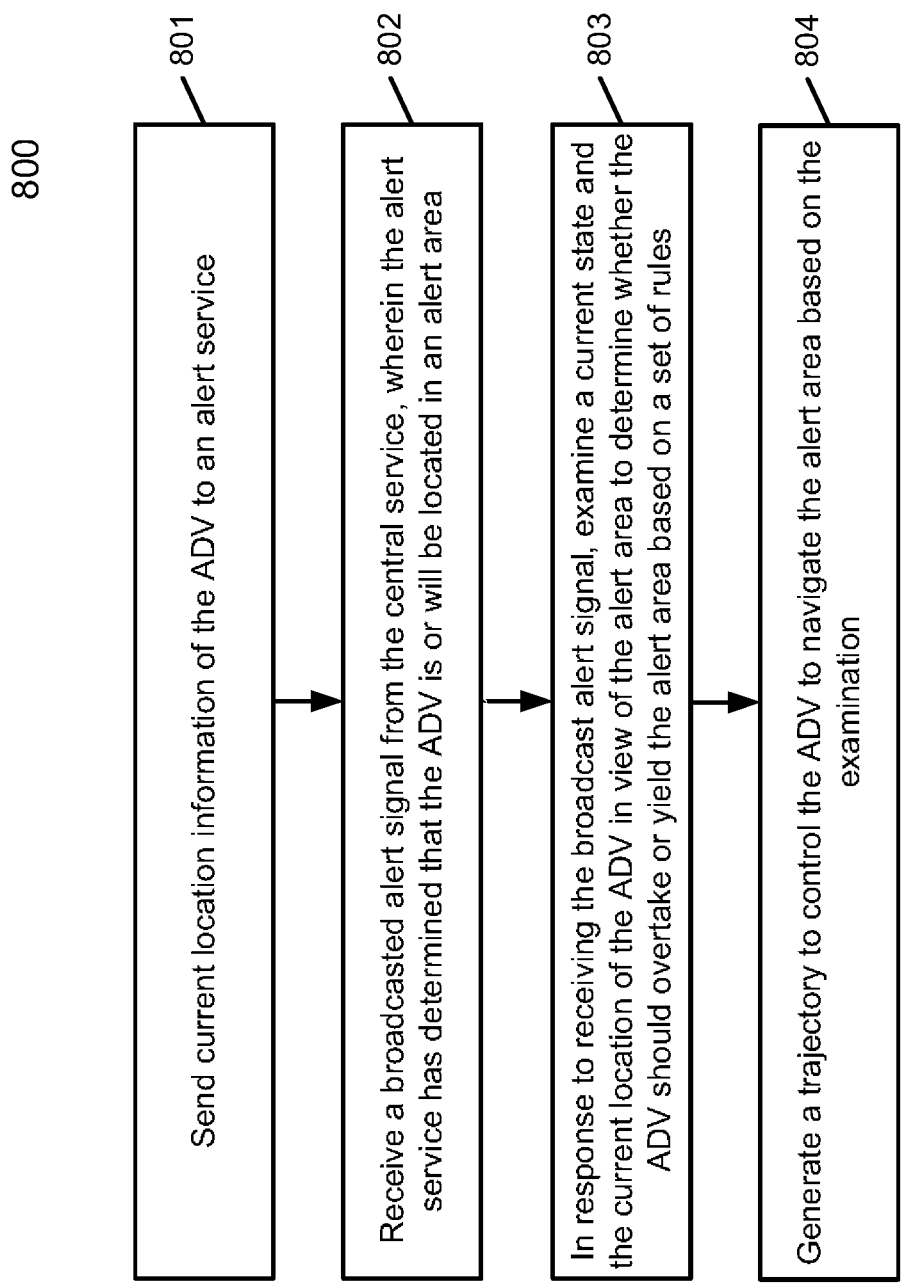
FIG. 8 is a flow diagram illustrating a method performed by an ADV according to one embodiment.

FIG. 8 is a flow diagram illustrating a method performed by an ADV according to one embodiment. Processing 800 may be performed by processing logic which may include software, hardware, or a combination thereof. For example, process 800 may be performed by alert module 308 of FIG. 3A. Referring to FIG. 8, at block 801, processing logic sends current location (and/or route) information of the ADV to an alert service over a network, where the alert service is communicatively coupled to a number of ADVs. At block 802, processing logic receives a broadcasted alert signal from the alert service, where the alert service has determined that the ADV is or will be located in an alert area, where the location of the alert area is determined based on a location (and/or route) information of a dispatched vehicle having a higher priority of traveling. At block 803, in response to receiving the broadcast alert signal, examines a current state (e.g., accelerating/decelerating, turning, or stopped) and the current location of the ADV in view of the alert area to determine whether the ADV should overtake, pull over, or yield the alert area based on a set of rules. In some embodiments, if the ADV is travelling ahead of the alert area, then the ADV should overtake the alert area, if the ADV is within the alert area, the ADV should pull over, and if the ADV is travelling behind the alert area, the ADV should yield to the alert area. At block 804, processing logic generates a trajectory to control the ADV to navigate the alert area based on the examination.

In one embodiment, processing logic receiving a second broadcast alert signal from the alert service. In response to receiving the second broadcast alert signal, processing logic controls the ADV to resume a normal operation of the ADV. In one embodiment, the emergency vehicle is one of the following: a police vehicle, a fire engine, an ambulance, and a police motorcycle.

In one embodiment, processing logic further sends a current speed information and a current route information of the ADV to the alert service for the alert service to determine whether to broadcast an alert signal to the ADV. In one embodiment, controlling the ADV to be in a yield state includes yielding, by the ADV, to incoming traffic including the emergency vehicle. In another embodiment, yielding by the ADV to incoming traffic includes signaling by the ADV in advance of decelerating towards a left or a right side of a current road of the ADV, decelerating the ADV to the left or the right side of the current road, and stopping near the left or the right side of the current road of the ADV in wait of further instructions.

In one embodiment, if the ADV is currently in an intersection, processing logic controlling the ADV to move away from the intersection prior to signaling by the ADV in advance of decelerating. In one embodiment, an alert area includes one or more road segments, where the alert service is triggered to send an alert signal to an ADV situated in the one or more road segments.

Figure 9:
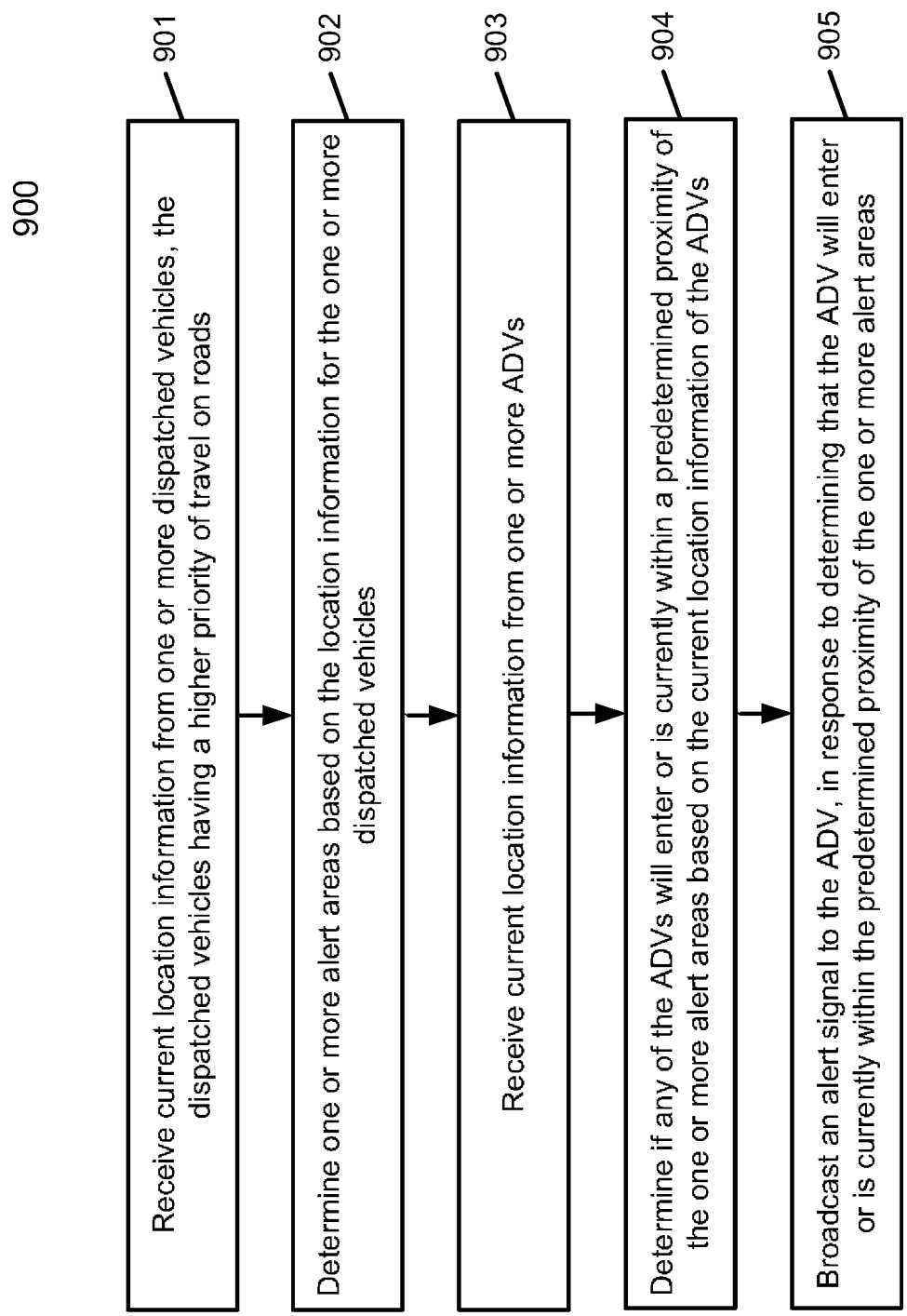
FIG. 9 is a flow diagram illustrating a method performed by an alert service according to one embodiment.

FIG. 9 is a flow diagram illustrating a method performed by an alert service according to one embodiment. Processing 900 may be performed by processing logic which may include software, hardware, or a combination thereof. For example, process 900 may be performed by alert service 125 of FIG. 1 or alert service 309 of FIG. 3A. Referring to FIG. 9, at block 901, processing logic receives current location information from one or more emergency vehicles, the emergency vehicles having a higher priority of travel on roads. At block 902, processing logic determines one or more alert areas based on the location information for the one or more emergency vehicles. At block 903, processing logic receives current location information from one or more ADVs. At block 904, processing logic determines if any of the ADVs will enter or is currently within a predetermined proximity of the one or more alert areas based on the current location information of the ADVs. At block 905, processing logic broadcasts an alert signal to the ADV, in response to determining that the ADV will enter or is currently within the predetermined proximity of the one or more alert areas.

In one embodiment, processing logic receives an updated location information from the one or more emergency vehicles. Processing logic determines one or more updated alert areas based on the updated location information of the one or more emergency vehicles. Processing logic receives updated current location information from the ADVs. Processing logic determines if any of the ADVs will exit or has exited from a predetermined proximity of the one or more updated alert areas based on the updated current location information of the ADVs. Processing logic broadcasts a second alert signal to the ADVs, in response to determining that the ADVs will exit or has already exited from a predetermined proximity of the one or more updated alert areas.

In another embedment, processing logic further receives a speed information or a route information from the one or more emergency vehicles. In another embodiment, the alert area is determined based on the speed or the route information of the one or more emergency vehicles.

In another embodiment, an alert area, corresponding to an emergency vehicle, is determined by: determining a current heading and a current direction of the emergency vehicle, determining a plurality of possible vehicle controls based on the current heading and the current direction of the emergency vehicle, and mapping out road segments based on the plurality of possible vehicle controls as possible locations for the emergency vehicle to arrive at after a predetermined period of time, wherein the road segments are used as the alert area. In another embodiment, processing logic further extends the road segments for a predetermined length and using the extending road segments as the alert area.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
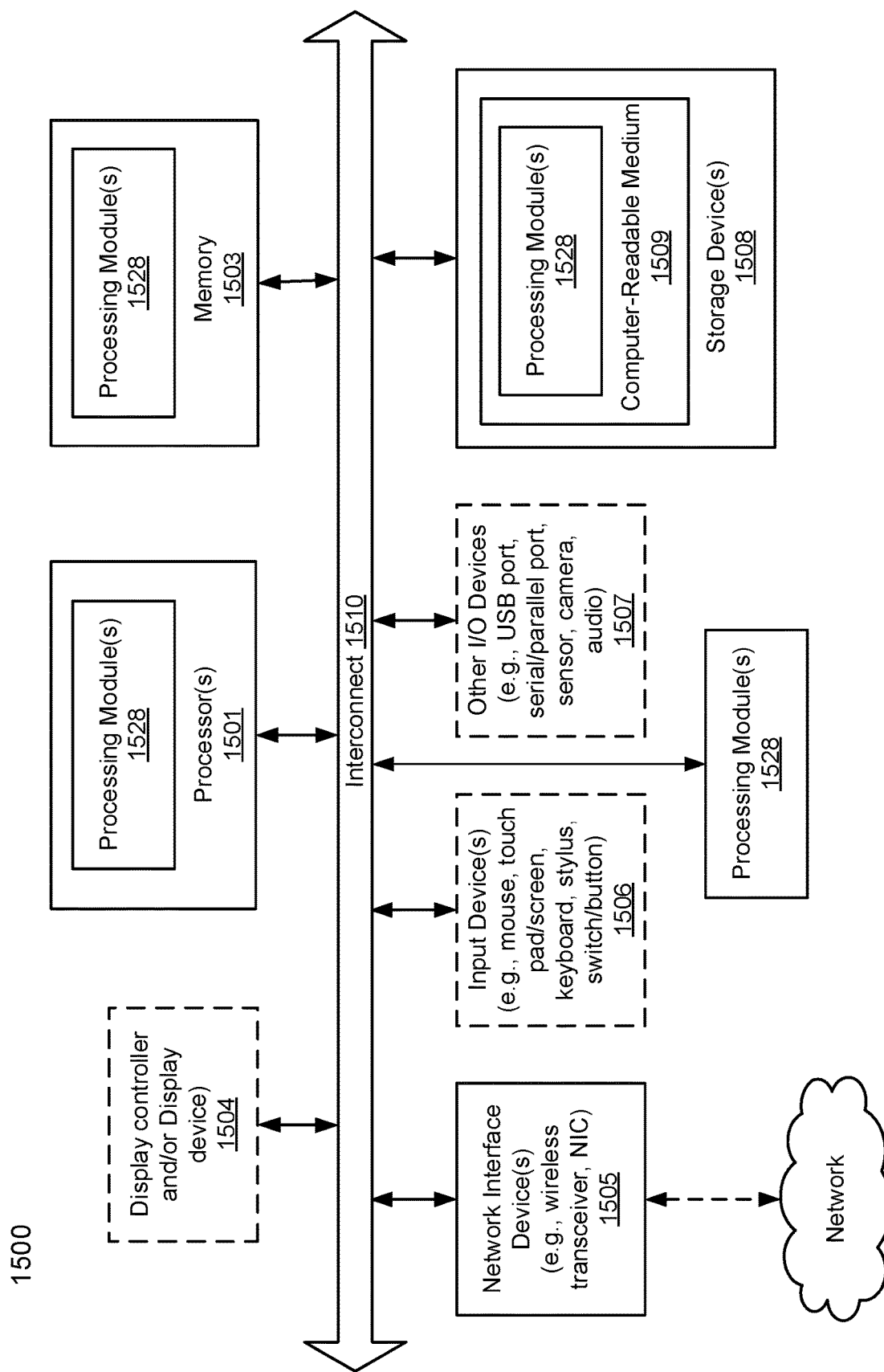
FIG. 10 is a block diagram illustrating a data processing system according to one embodiment.

FIG. 10 is a block diagram illustrating an example of a data processing system which may be used with one embodiment of the disclosure. For example, system 1500 may represent any of data processing systems described above performing any of the processes or methods described above, such as, for example, perception and planning system 110, alert service 125, or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

10 devices 1507 may include an audio device. An audio device may include a speaker and/or a microphone to facilitate voice-enabled functions, such as voice recognition, voice replication, digital recording, and/or telephony functions. Other 10 devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, alert module 308, and alert service 309 of FIG. 3A. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:

sending current location information of the ADV to an alert service over a network, wherein the alert service is in communication with one or more ADVs;

receiving a broadcast alert signal from the alert service, wherein the alert service has determined that the ADV is or will be located in an alert area, wherein the location of the alert area is determined based on a location of an emergency vehicle having a higher priority of travel;

in response to receiving the broadcast alert signal, examining a current state and the current location of the ADV in view of the alert area to determine whether the ADV should overtake or yield the alert area based on a set of rules;

generating a trajectory to control the ADV to navigate the alert area based on the examination;

controlling the ADV to be in a yield state comprising yielding, by the ADV, to incoming traffic including the emergency vehicle; and if the ADV is in an intersection, controlling the ADV to move away from the intersection prior to yielding to the incoming traffic.

2. The computer-implemented method of claim 1, further comprising:

receiving a second broadcast alert signal from the alert service; and in response to receiving the second broadcast alert signal, controlling the ADV to resume a normal operation of the ADV.

3. The computer-implemented method of claim 1, wherein the emergency vehicle is one of the following: a police vehicle, a fire engine, an ambulance, and a police motorcycle.

4. The computer-implemented method of claim 1, further comprising sending a current speed information and a current route information of the ADV to the alert service for the alert service to determine whether to broadcast an alert signal to the ADV.

5. The computer-implemented method of claim 1, wherein yielding, by the ADV, to incoming traffic comprises:

signaling by the ADV in advance of decelerating towards a left or a right side of a current road of the ADV;

decelerating the ADV to the left or the right side of the current road; and stopping near the left or the right side of the current road of the ADV in wait of further instructions.

6. The computer-implemented method of claim 1, further comprising if the ADV is currently in an intersection, controlling the ADV to move away from the intersection prior to signaling by the ADV in advance of decelerating.

7. The computer-implemented method of claim 1, wherein an alert area includes one or more road segments, wherein the alert service is triggered to send an alert signal to an ADV situated in the one or more road segments.

8. A non-transitory machine-readable medium having instructions stored therein, which when executed by one or more processors, cause the one or more processors to perform operations, the operations comprising:

sending a current location information of the ADV to an alert service over a network, wherein the alert service is in communication with one or more ADVs;

receiving a broadcast alert signal from the alert service, wherein the alert service has determined that the ADV is or will be located in an alert area, wherein the location of the alert area is determined based on a location of an emergency vehicle having a higher priority of travel;

in response to receiving the broadcast alert signal, examining a current state and the current location of the ADV in view of the alert area to determine whether the ADV should overtake or yield the alert area based on a set of rules;

generating a trajectory to control the ADV to navigate the alert area based on the examination, controlling the ADV to be in a yield state comprising yielding, by the ADV, to incoming traffic including the emergency vehicle; and if the ADV is in an intersection, controlling the ADV to move away from the intersection prior to yielding to the incoming traffic.

9. The non-transitory machine-readable medium of claim 8, wherein the operations further comprise:

receiving a second broadcast alert signal from the alert service; and in response to receiving the second broadcast alert signal, controlling the ADV to resume a normal operation of the ADV.

10. The non-transitory machine-readable medium of claim 9, wherein the emergency vehicle is one of the following: a police vehicle, a fire engine, an ambulance, and a police motorcycle.

11. A data processing system, comprising:

one or more processors; and a memory coupled to the one or more processors to store instructions, which when executed by the one or more processors, cause the one or more processors to perform operations, the operations including sending a current location information of the ADV to an alert service over a network, wherein the alert service is in communication with one or more ADVs;

receiving a broadcast alert signal from the alert service, wherein the alert service has determined that the ADV is or will be located in an alert area, wherein the location of the alert area is determined based on a location of an emergency vehicle having a higher priority of travel;

in response to receiving the broadcast alert signal, examining a current state and the current location of the ADV in view of the alert area to determine whether the ADV should overtake or yield the alert area based on a set of rules;

generating a trajectory to control the ADV to navigate the alert area based on the examination, controlling the ADV to be in a yield state comprising yielding, by the ADV, to incoming traffic including the emergency vehicle; and if the ADV is in an intersection, controlling the ADV to move away from the intersection prior to yielding to the incoming traffic.

12. The system of claim 11, wherein the operations further comprise:

receiving a second broadcast alert signal from the alert service; and in response to receiving the second broadcast alert signal, controlling the ADV to resume a normal operation of the ADV.

13. The system of claim 12, wherein the emergency vehicle is one of the following: a police vehicle, a fire engine, an ambulance, and a police motorcycle.

14. A computer-implemented method for operating an alert service to broadcast alert signals to autonomous driving vehicles, the method comprising:

receiving current location information from one or more emergency vehicles, the emergency vehicles having a higher priority of travel on roads;

determining one or more alert areas based on the location information for the one or more emergency vehicles;

receiving current location information from one or more ADVs;

determining if any of the ADVs will enter or is currently within a predetermined proximity of the one or more alert areas based on the current location information of the ADVs; and broadcasting an alert signal to an ADV, in response to determining that the ADV will enter or is currently within the predetermined proximity of the one or more alert areas, wherein in response to receiving the broadcast alert signal, if the ADV is in an intersection, the ADV is to move away from the intersection prior to yielding to incoming traffic.

15. The computer-implemented method of claim 14, further comprising:

receiving an updated location information from the one or more emergency vehicles;

determining one or more updated alert areas based on the updated location information of the one or more emergency vehicles;

receiving updated current location information from the ADVs;

determining if any of the ADVs will exit or has exited from a predetermined proximity of the one or more updated alert areas based on the updated current location information of the ADVs; and broadcasting a second alert signal to the ADVs, in response to determining that the ADVs will exit or has already exited from a predetermined proximity of the one or more updated alert areas.

16. The computer-implemented method of claim 15, further comprising receiving a speed information or a route information from the one or more emergency vehicles.

17. The computer-implemented method of claim 16, wherein the alert area is determined based on the speed or the route information of the one or more emergency vehicles.

18. The computer-implemented method of claim 17, wherein an alert area, corresponding to an emergency vehicle, is determined by, determining a current heading and a current direction of the emergency vehicle;

determining a plurality of possible vehicle controls based on the current heading and the current direction of the emergency vehicle; and mapping out road segments based on the plurality of possible vehicle controls as possible locations for the emergency vehicle to arrive at after a predetermined period of time, wherein the road segments are used as the alert area.

19. The computer-implemented method of claim 18, further comprising extending the road segments for a predetermined length and using the extending road segments as the alert area.

* * * * *